Feb. 8, 1966  R. RINESCH  3,234,011
PROCESS FOR THE PRODUCTION OF STEEL
Filed March 21, 1963  3 Sheets-Sheet 1

INVENTOR.
RUDOLF RINESCH
BY
HIS ATTORNEYS

Feb. 8, 1966  R. RINESCH  3,234,011
PROCESS FOR THE PRODUCTION OF STEEL
Filed March 21, 1963  3 Sheets-Sheet 2
FIG. 2
30 ton charge composed of 50% scrap and 50% solid crude iron (charge 1)
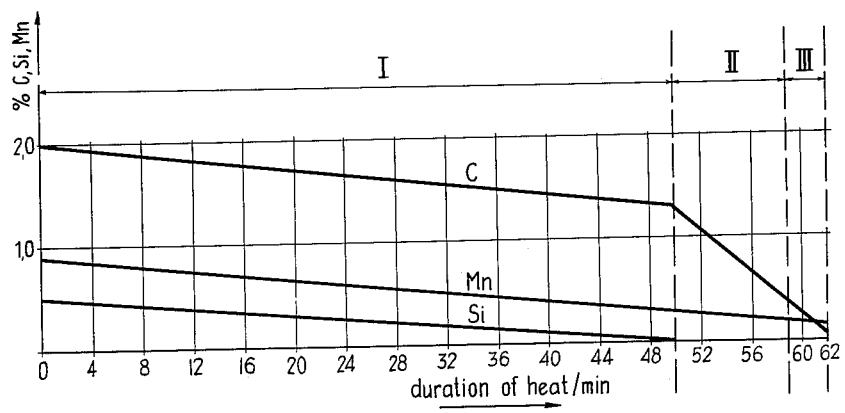
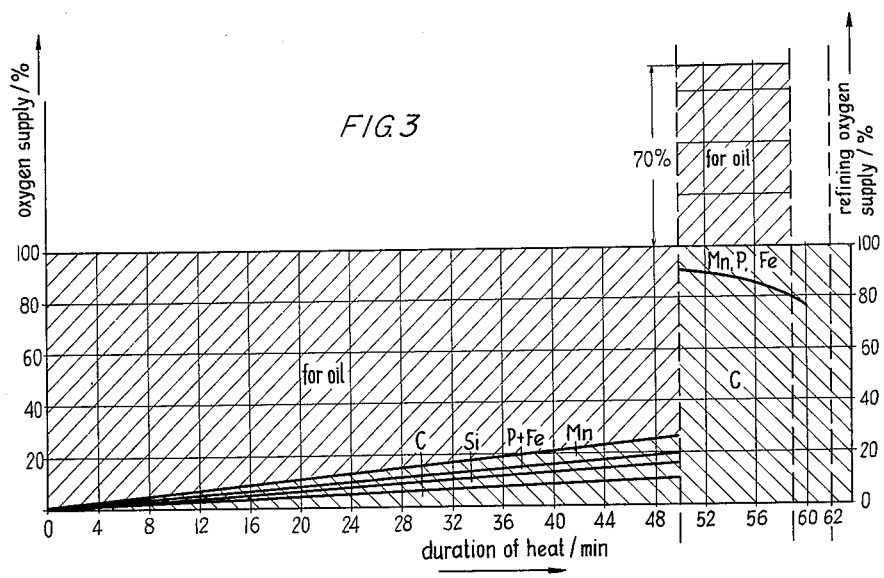
I = pure heating period (smelting period)
II = boiling period (combined heating and refining period)
III = purifying period
*INVENTOR.*
RUDOLF RINESCH
BY
Brumbaugh, Free, Graves & Donohue
HIS ATTORNEYS Feb. 8, 1966   R. RINESCH   3,234,011
PROCESS FOR THE PRODUCTION OF STEEL
Filed March 21, 1963   3 Sheets-Sheet 3
FIG.4
30 ton charge composed of: 67% liquid crude iron
20% scrap   (charge 2)
13% solid crude iron
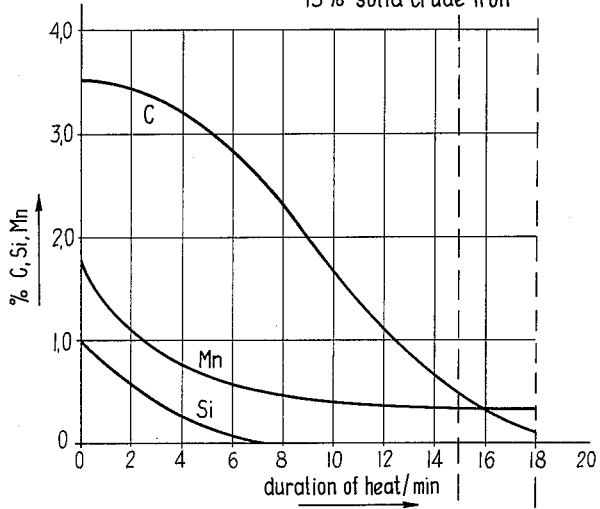
II = boiling period (combined heating and refining period)
III = purifying period
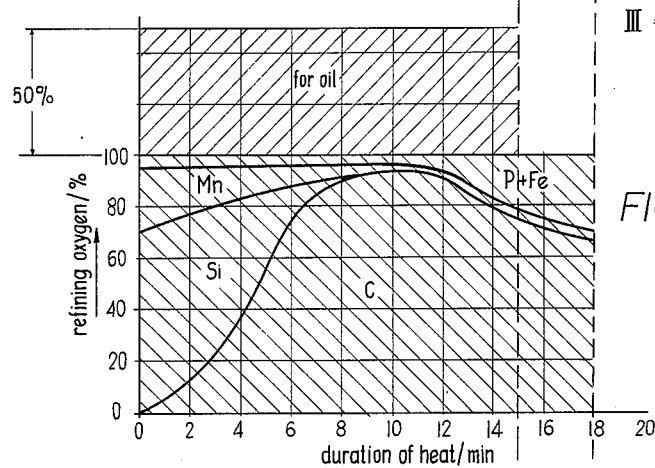
FIG.5
INVENTOR.
RUDOLF RINESCH
BY
HIS ATTORNEYS United States Patent Office
3,234,011
Patented Feb. 8, 1966

3,234,011
PROCESS FOR THE PRODUCTION OF STEEL
Rudolf Rinesch, Froschberg, Linz, Austria, assignor to BOT Brassert Oxygen Technik AG., Zurich, Switzerland, a company of Switzerland
Filed Mar. 21, 1963, Ser. No. 266,854
Claims priority, application Austria, Apr. 7, 1962, A 2,882/62
3 Claims. (Cl. 75—60)

This invention relates to a process for the production of steel by blowing a charge of liquid and/or solid crude iron, scrap, iron ore, slag-forming agents and the like disposed in an erect crucible, with oxygen or oxygen-enriched air, by means of a vertical lance.

Top-blowing processes using oxygen are known. They comprise blowing a jet of oxygen against the surface of liquid crude iron in the presence of a basic slag, whereby the accompanying elements contained in the crude iron such as carbon, silicon, phosphorus and manganese are eliminated and partly incorporated in the slag. The combustion reactions of these elements are exothermic, and the liberated heat is sufficient in most cases to heat the bath to the temperature required for pouring the steel produced and to melt scrap in certain amounts, e.g. 10 to 20%.

In carrying out such refining processes it is often desired to be independent of the content of the so-called heat-carrying elements in the crude iron, which are those accompanying elements which liberate heat during their combustion, or to be able to add an amount of scrap larger than that which corresponds to the heat balance calculated in view of the given content of heat-carrying elements. It is also desirable to be able to charge part of the crude iron in solid form, particularly in cases where a blast furnace and a hot-metal mixer are not available. It may further be desirable to keep the produced steel hot for some time at the end of the refining process, which is required, e.g., for adding alloying elements.

It has already been proposed to increase the heat content of the bath by supplying additional heat-carrying elements such as ferrosilicon, ferromanganese or the like to the bath. These fuels are expensive, however, and enable only a modest improvement of the heat content. On the other hand, it has been proposed to add finely divided carbonaceous materials such as oil, gas or the like to the refining agent itself, i.e. to the jet of refining oxygen. It has been shown, however, that these known processes involve two considerable disadvantages. One of these disadvantages is that the fuels impart impurities, particularly nitrogen, hydrogen and sulphur, into the steel, which is detrimental to the quality of the steel. The second difficulty resides in that the fuels added are not sufficiently utilized. The gas evolved in the crucible during the refining process carries the fuel added into the upper part of the crucible, and they are burnt substantially not before they are slopped from the crucible mouth. As a result, only the flue and the structure in the upper part of the crucible are heated, whereas the bath is not heated to the desired degree.

The object of the invention is to avoid these disadvantages and difficulties. The invention is based on the recognition that the addition of fuel should not be continued during the entire course of the refining process, and involves a control of the amount of fuel supplied, depending on the consumption of refining oxygen.

According to its main feature, the process of the invention is characterized in that the supply of fuel is terminated before the carbon content desired in the finished product is reached. Suitably the supply of fuel is stopped when a value ranging at least 0.20%, particularly 0.30 to 0.50%, above the carbon content desired in the finished steel is reached. As defined in terms of time, the supply of fuel is terminated with advantage 2 to 6 minutes before the carbon content desired in the finished steel is reached.

The control according to the invention of the amount of fuel supplied consists in adjusting the fuel supply during the boiling period in such manner that the maximum amount of oxygen required for its conbustion is 70%, and preferably 50%, of the respective amount of refining oxygen supplied.

In this way, the difficulties described above are reliably eliminated. The interruption of the fuel supply during the last step of the process ensures the recovery of a faultless, pure steel as a final product. The nitrogen content in the finished steel ranges between 0.002 and 0.004%, and the hydrogen content between 2 and 4 normal cu. cm./100 g. Fe, the comparable values for steel produced without observing the teaching of the invention, i.e. with a continuous addition of fuel until the end of the refining process, being about twice as high, namely between 0.006 and 0.010% nitrogen and between 4 and 8 normal cu. cm. H/100 g. Fe. The limitation of the fuel supply ensures a favourable utilization of the calorific value of the fuels and renders it possible to supply a desired amount of heat to the charge, either for carrying out the conversion of the crude iron having only a low content of heat-carrying elements, or for incorporating large amounts of scrap in crude iron having a normal content of heat-carrying elements, or for charging crude iron in solid form, or to realize these possibilities in combination.

For a better understanding of the present invention, reference may be had to the accompanying drawings, in which:

FIGURE 2 is a chart illustrating the process embodying the invention using a charge composed of 50% scrap and 50% solid crude iron, and the variations in the content of impurities in dependence on time;

FIGURE 3 is a chart illustrating the process relating to a charge composed of 50% scrap and 50% solid crude iron and showing the amount of oxygen supplied in dependence on time and the proportions of the oxygen supplied consumed for the oxidation of the impurities and for the combustion of fuel;

FIGURE 4 is a chart similar to FIGURE 2 and relating to a charge composed of 67% liquid crude iron, 20% scrap and 13% solid crude iron; and FIGURE 5 is a chart similar to the chart shown in FIGURE 3 relating to a charge composed of 67% liquid crude iron, 20% scrap and 13% solid crude iron.

Figure 1:
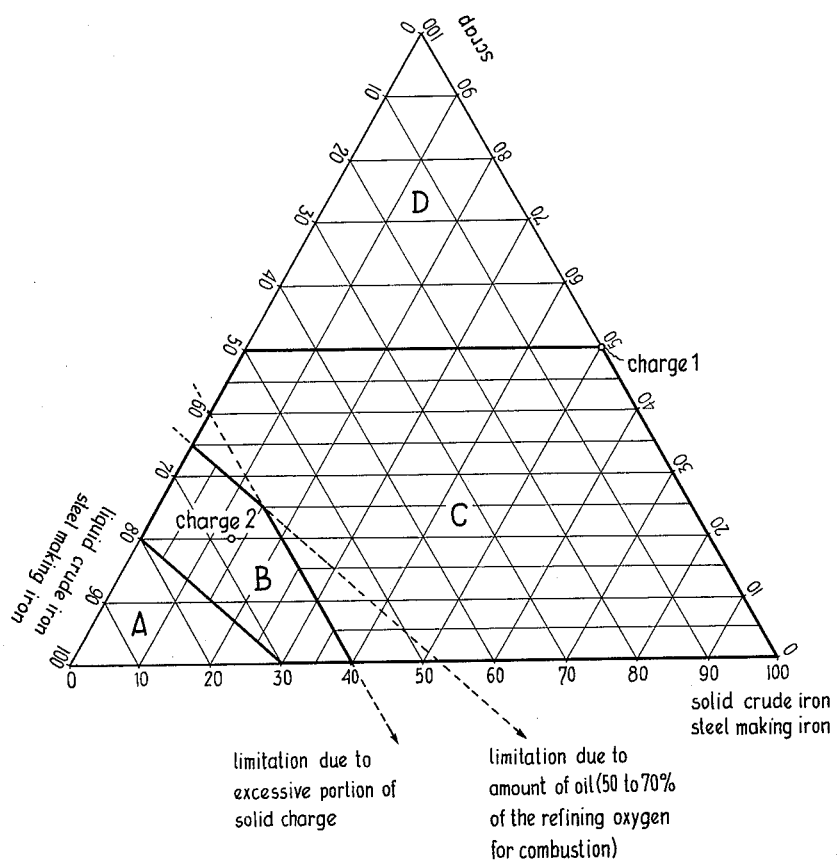
FIGURE 1 is a chart of the application of the charging materials, liquid crude iron, solid crude iron, and scrap, for a 30 ton crucible, assuming that the crude iron is steel iron.

The characteristic features of the process of the invention are illustrated in the annexed drawings.

FIG. 1 is a chart of the applications of the charging materials: liquid crude iron, solid crude iron, and scrap, for a 30 ton crucible, presuming that the crude iron is steel-making iron. Field A indicates charges with a predominant portion of liquid crude iron, which do not require a heat supply. This field thus falls outside the scope of the process of the invention. Field B indicates charges which, due to their larger percentage of scrap or solid crude iron, would not reach the teeming temperature. Accordingly, additional heat has to be supplied to such charges, which is effected during the refining process. This field thus denotes the preferred field of application of the process of the invention. Field C indicates charges comprising a very high percentage of solid charging materials. In this case it will no longer be sufficient to supply additional heat during the refining process, and the refining period is preceded by a pure heating period. After smelting, these charges are treated in the same manner as those according to field B. Finally, field D indicates charges comprising a predominant percentage of scrap which has only a low content of chemical heat carriers. The charges of field D thus require a long pure smelting period in which there is no appreciable refining action. The process of the invention can be applied to such charges only when, after the smelting period, the charge has been liquefied. In this case it is necessary to add carbon to the charges so that the subsequent refining operation is feasible.

Whereas, as has been mentioned, FIG. 1 is characteristic for a 30 ton converter, analogous conditions exist in the case of larger crucibles; however, in that case the limits between the fields AB and BC are shifted somewhat in the direction of the solid charging materials. With a 100 ton converter the shift will be about 10%.

As is evident, the extreme case regarding the proportion of heating oxygen to refining oxygen will be a charge of 50% solid crude iron and 50% scrap (Charge 1). The oil requirement for a charge of the said composition for a 30 ton crucible is about 69 l./ton of charge. The requirement of refining oxygen is 32 N cu. m./ton of charge (again calculated for steel-making iron), whereas the requirement of heating oxygen is 103 N cu. m./ton. It was found that the most economic oil rate is about 1.11 l./ton/min., and the optimal oxygen supply during the smelting period is about 2 N cu. m./l of fuel oil. From this total amount about 1.5 N cu. m. is consumed for the combustion of the fuel oil, while the rest already causes a slight refining action. With melts having a high percentage of scrap (low content of heat carriers in the charge and, consequently, small proportion of refining oxygen) it is suitable to keep the oxygen supply per litre of fuel oil somewhat below 2 N cu. m. during the refining period, in order to obtain a more favourable ratio of heating oxygen to refining oxygen during the refining period.

In FIGS. 2 and 3 the course of the process and the proportional relation between the oxygen required for refining and the oxygen required for heating are shown, the above-described extreme case with a composition of the charge of 50% scrap and 50% solid crude iron being represented. The process follows a three step course, viz. steps I, II and III, step I being a pure heating period (smelting period), step II being a combined heating and refining period (boiling period), and step III being the purifying period provided by the invention in which no fuel is supplied. It is obvious that in the boiling period an amount of oxygen of about 70% of the stoichiometric amount of refining oxygen was consumed. During the smelting period the oxygen supply was 1.7 N cu. m./l. of fuel oil.

FIGS. 4 and 5 are similar showings for a charge composed of 67% liquid crude iron, 20% scrap and 13% solid crude iron. Charge 2 ranges in field B which, as has been mentioned, represents the preferred field of application of the process of the invention. The process is again divided into the steps II and III, step II being the boiling period and step III the purifying period. At the beginning of the process, refining reactions are initiated. The fuel supply is so adjusted that the maximum amount of oxygen required for its combustion is 50% of the refining oxygen. In step III no fuel is supplied and consequently no oxygen is consumed for this purpose.

Further characteristics of the process of the invention are explained in the following examples.

*Example 1*

A charge consisting of 4800 kg. solid crude iron having the following values: 3.84% C, 0.96% Si, 1.80% Mn, 0.148% P and 0.063% S, 7190 kg. scrap and 24.030 kg. liquid crude iron containing 4.17% C, 0.79% Si, 1.64% Mn, 0.150% P and 0.032% S is charged in a refractory-lined crucible. A blowing device comprising a central inner oxygen blowing tube, a fuel supply tube concentrically surrounding the oxygen blowing tube, and an outer oxygen tube concentrically surrounding the fuel supply tube, the annular cross-sectional area being 2226 sq. mm. and the circular cross-sectional area for the oxygen supply being 707 sq. mm., is adjusted to a distance of 3 m. above the so-called $H_3$ mark, "$H_3$" designating the lowest position of the nozzle tip which lies 65 cm. above the initial bath level of the normal charge, and the oxygen and fuel supply is started. After addition of 1500 kg. lime, 50 kg. fluorspar and 150 kg. bauxite the blowing device is adjusted to flow rates of 4800 N cu. m./h. of oxygen fed through the inner tube and 1800 N cu. m./h. of oxygen fed through the outer tube, while at the same time the oil flow rate is 24 l./min., which values are maintained for a blowing period of 14.4 minutes. At this point a preliminary sample shows a carbon content of 0.50%. The oil is now shut off and the oxygen supply through the outer tube is reduced to a rate of 1200 N cu. m./h. During this period, which lasts for three minutes, the bath is only refined, but no longer heated. Then the bath is deslagged, the slag is stiffened and the steel is teemed. The finished steel has a composition of: 0.07% C, 0% Si, 0.39% Mn, 0.022% P, 0.026% S, 0.0035% N and 2.5 N cu. cm. H/100 g. Fe.

*Example 2*

A charge consisting of 18 tons of solid crude iron having the following values: 4.00% C, 1.62 Mn, 1.02% Si, 0.138% P and 0.052% S, and 18 tons of steel scrap is charged in a refractory-lined crucible. After adjustment of the lance as described in Example 1, the lance begins to operate at a distance of 1500 mm. above the solid charge in the crucible, the nozzle being adjusted depending on the progress of the smelting process. An amount of oxygen of 80 N cu. m./min., which is equally distributed to the central inner tube and to the outer tube, is supplied, and at the same time 40 l. of oil per minute is fed through the annular fuel supply tube. In this case, for smelting a solid charge, the oxygen supply is 2 N cu. m./l. of oil, whereby a complete combustion to $CO_2$ is obtained, while in the case of a solid charge where refining reactions take place beside the heating, only about 1.5 N cu. m. $O_2$/l. of oil is supplied. As the temperature in the melting vessel rises and the charge is gradually liquified an increasing amount of the fuel is burnt only to CO, and the remaining excess of oxygen already acts as a refining agent. After the heating period of 50 minutes the rate of oxygen flow through the inner tube is increased from 40 N cu. m./min. to approximately 100 N cu. m./min., whereas the outer tube is throttled to an oxygen flow rate of 25 N cu. m./min. At the same time, the oil supply is reduced from 40 to 33 l./min. During this period of nine minutes, which substantially corresponds to the boiling period, refining is going on simultaneously with the heating, and about 75 N cu. m./min. of the oxygen is consumed for the refining. At the end of this period a preliminary sample showed a carbon content of 0.45%. Subsequently, the oil supply is interrupted from the 59th to the 62nd minute, and the oxygen supply is reduced at the same time to 75 N cu. m./min.; this amount of oxygen is supplied only through the inner tube. Part of the slag-forming agents were already added during the heating period, and the rest was added at the beginning of the boiling period. A total of 1500 kg. of lime, 50 kg. of fluorspar and 150 kg. of bauxite was added.

After deslagging and teeming of the steel the finished steel had a composition of: 0.03% C, 0.15% Mn, 0.014% P, 0.033% S, 0.0040% N, and 4 N cu. cm. H/100 g. Fe.

What I claim is:

1. A process for the production of steel comprising introducing into a crucible a charge containing slag-forming materials and a ferrous charging material selected from the group consisting of liquid and solid crude iron, and scrap, said charge having a content of chemical heat carriers which is insufficient for attaining the temperature required for teeming, blowing the charge from above with an oxygen-containing gas and a fuel to supply heat to and refine the charge in a combined heating and refining period (boiling period), the rate at which said fuel and the oxygen are supplied being controlled during the boiling period so that the oxygen required for the combustion of said fuel will not exceed 70% of the oxygen required for oxidizing said chemical heat carriers, and terminating the addition of fuel at a carbon value ranging from 0.20 to 0.50% above the carbon content desired in the finished steel.

2. A process as set forth in claim 1, wherein said addition of fuel is terminated about 2 to 6 minutes before the carbon content desired in the finished steel is reached.

3. A process as set forth in claim 1, wherein the charge comprises at least 50% steel-making iron and the fuel rate is 1 to 1.2 l./min./ton of charge and the oxygen rate is 1.4 to 1.6 N cu. m./l. of fuel oil.

References Cited by the Examiner
UNITED STATES PATENTS

| | | | |
|---|---|---|---|
| 2,820,706 | 1/1958 | Larsen | 75—52 |
| 2,993,781 | 7/1961 | Kerlie | 75—52 |
| 3,030,202 | 4/1962 | De Galocsy | 75—52 |
| 3,088,821 | 5/1963 | Brion | 75—60 |

FOREIGN PATENTS

| | | |
|---|---|---|
| 847,848 | 9/1960 | Great Britain. |
| 888,763 | 2/1962 | Great Britain. |

DAVID L. RECK, *Primary Examiner.*

BENJAMIN HENKIN, *Examiner.*